US012614303B2

(12) United States Patent (10) Patent No.: US 12,614,303 B2

Rezazadeh et al. (45) Date of Patent: Apr. 28, 2026

(54) SYSTEM AND METHOD FOR MULTIMODAL OBJECT-CENTRIC REPRESENTATION LEARNING

(71) Applicant: Honda Motor Co., Ltd., Tokyo (JP)

(72) Inventors: Alireza Rezazadeh, Minneapolis, MN (US); Nawid Jamali, Dublin, CA (US); Soshi Iba, Mountain View, CA (US)

(73) Assignee: Honda Motor Co., Ltd., Tokyo (JP)

( * ) Notice: Subject to any disclaimer, the term of this patent is extended or adjusted under 35 U.S.C. 154(b) by 437 days.

(21) Appl. No.: 17/891,185

(22) Filed: Aug. 19, 2022

(65) Prior Publication Data

US 2024/0062410 A1 Feb. 22, 2024

(51) Int. Cl.
 *G06V 10/50* (2022.01)
 *G06T 7/11* (2017.01)
 *G06T 7/55* (2017.01)
 *G06T 7/73* (2017.01)

(52) U.S. Cl.
 CPC .................. *G06T 7/73* (2017.01); *G06T 7/11* (2017.01); *G06T 7/55* (2017.01); *G06V 10/50* (2022.01); *G06T 2207/10024* (2013.01); *G06T 2207/10028* (2013.01); *G06T 2207/20016* (2013.01); *G06T 2207/20081* (2013.01); *G06T 2207/20132* (2013.01)

(58) Field of Classification Search
 CPC ..... G06T 7/73; G06T 7/11; G06T 7/55; G06T 2207/10024; G06T 2207/10028; G06T 2207/20016; G06T 2207/20081; G06T 2207/20132; G06T 2210/56; G06T 17/00; G06V 10/50; G06V 10/25; G06V 10/803; G06V 10/82
 See application file for complete search history.

(56) References Cited

U.S. PATENT DOCUMENTS

| 11,100,669 B1 * | 8/2021 | Zhou ..................... G01S 13/867 |
| 2022/0277472 A1 * | 9/2022 | Birchfield ................ G06N 3/08 |
| 2023/0033177 A1 * | 2/2023 | Goel ..................... G06V 20/58 |

FOREIGN PATENT DOCUMENTS

WO WO-2023124676 A1 * 7/2023

OTHER PUBLICATIONS

Shen et al, Multi-receptive field graph convolutional neural networks for pedestrian detection, 2019, IET Intelligent Transport Systems pp. 1-10. (Year: 2019).*
Ding et al, Learning Depth-Guided Convolutions for Monoculaar 3D Object Detection, 2020, IEEE/CVF Conference on Computer Vision and Pattern Recognition, pp. 1-10. (Year: 2020).*

(Continued)

*Primary Examiner* — Kathleen M Broughton

(74) *Attorney, Agent, or Firm* — Rankin, Hill & Clark LLP

(57) ABSTRACT

A system and method for multimodal object-centric representation learning that include receiving data associated with an image and a depth map of an object. The system and method also include determining an object-surface point cloud based on the image and the depth map. The system and method additionally include determining multi-resolution receptive fields based on the object-surface point cloud. The system and method further include passing the multi-resolution receptive fields through convolutional encoders to learn an object centric representation of the object.

21 Claims, 5 Drawing Sheets

(56) References Cited

OTHER PUBLICATIONS

Zheng et al, PointRas: Uncertainty-Aware Multi-Resolution Learning for Point Cloud Segmentation, 2022, IEEE Transactions on Image Processing, 31(2022): 6002-6016. (Year: 2022).*

Li et al, Enhancing 3-D LiDAR Point Clouds with Event-Based Camera, 2021, IEEE Transactions on Instrumentation and Measurement, 70 (2021) pp. 1-12. (Year: 2021).*

Luo et al, Multi-scale receptive field fusion network for lightweight image super-resolution, 2022, Neurocomputing 493 (2022) 314-326. (Year: 2022).*

Mao et al, Beyond single receptive field: A receptive field fusion-and-stratification network for airborne laser scanning point cloud classification,2022, arXiv: 2207.10278v1, pp. 1-19. (Year: 2022).*

Engelmann et al, Dilated Point Convolutions: On the Receptive Field Size of Point Convolutions on 3D Point Clouds, 2020, arXiv: 1907.12046v3, pp. 1-7. (Year: 2020).*

Jonathan Tremblay, Thang To, Balakumar Sundaralingam, Yu Xiang, Dieter Fox, and Stan Birchfield. Deep Object Pose Estimation for Semantic Robotic Grasping of Household Objects. In Conference on Robot Learning (CoRL), 2018.

Chen Wang, Danfei Xu, Yuke Zhu, Roberto Martin-Martin, Cewu Lu, Li Fei-Fei, and Silvio Savarese. DenseFusion: 6D Object Pose Estimation by Iterative Dense Fusion. In Computer Vision and Pattern Recognition, 2019.

David Watkins-Valls, Jacob Varley, and Peter Allen. Multi-Modal Geometric Learning for Grasping and Manipulation. In IEEE International Conference on Robotics and Automation (ICRA), 2019.

Yu Xiang, Tanner Schmidt, Venkatraman Narayanan, and Dieter Fox. PoseCNN: A Convolutional Neural Network for 6D Object Pose Estimation in Cluttered Scenes. In Robotics: Science and Systems (RSS), 2018.

Honglin Yuan and Remco C Veltkamp. 6D Object Pose Estimation With Color/Geometry Attention Fusion. Technical report.

* cited by examiner

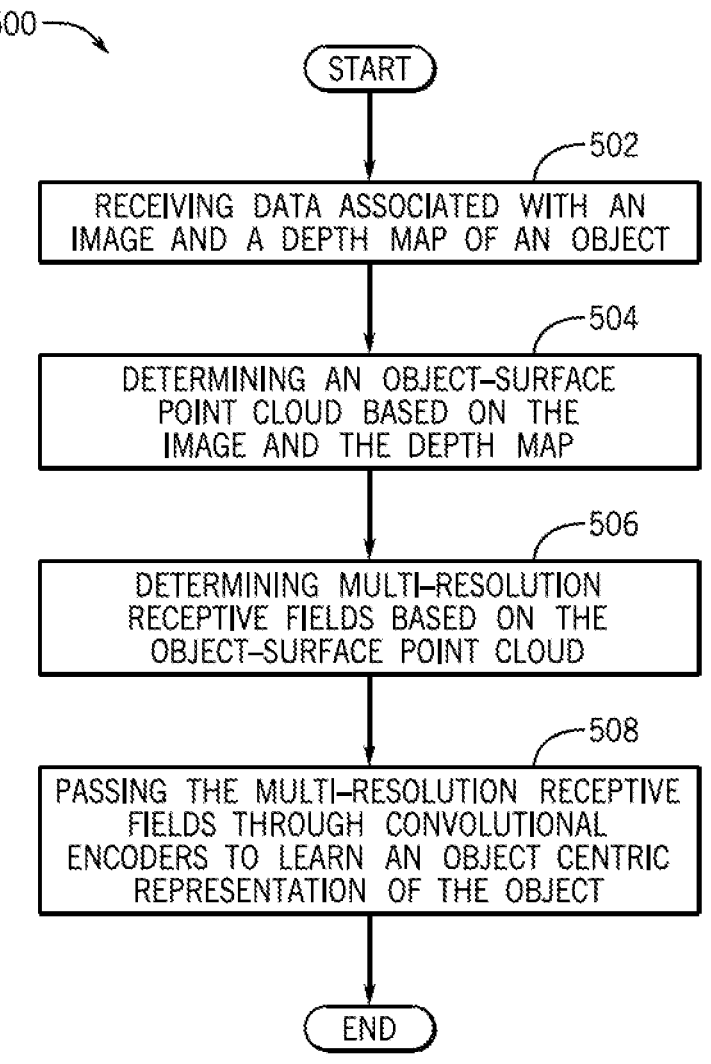

500

START

502
RECEIVING DATA ASSOCIATED WITH AN
IMAGE AND A DEPTH MAP OF AN OBJECT

504
DETERMINING AN OBJECT-SURFACE
POINT CLOUD BASED ON THE
IMAGE AND THE DEPTH MAP

506
DETERMINING MULTI-RESOLUTION
RECEPTIVE FIELDS BASED ON THE
OBJECT-SURFACE POINT CLOUD

508
PASSING THE MULTI-RESOLUTION RECEPTIVE
FIELDS THROUGH CONVOLUTIONAL
ENCODERS TO LEARN AN OBJECT CENTRIC
REPRESENTATION OF THE OBJECT

END

FIG. 5

SYSTEM AND METHOD FOR MULTIMODAL OBJECT-CENTRIC REPRESENTATION LEARNING

BACKGROUND

Object understanding from images, which may involve object recognition, pose estimation, and object identification may be an important and widely studied problem in the quest for visual intelligence. Object understanding in images may be important in many applications where agents may learn by understanding object based information to perform complex tasks that often involve interactions with objects. However, in many cases performing complex multi-dimensional pose estimation of an object may use manually intensive training of multiple datasets which may limit the ability to complete efficient image based object identification. Furthermore, the subjective nature of labeling with respect to object based information may result in ambiguities for object based analysis and pose estimation.

BRIEF DESCRIPTION

According to one aspect, a computer-implemented method for multimodal object-centric representation learning is provided. The computer-implemented method may include receiving data associated with an image and a depth map of an object. The computer-implemented method may also include determining an object-surface point cloud based on the image and the depth map. The computer-implemented method may additionally include determining multi-resolution receptive fields based on the object-surface point cloud. The computer-implemented method may further include passing the multi-resolution receptive fields through convolutional encoders to learn an object centric representation of the object. The object centric representation is utilized to electronically control at least one electronic component to complete at least one object specific task associated with the object.

According to another aspect, a system for multimodal object-centric representation learning that includes a memory storing instructions is provided. The instructions when executed by a processor may cause the processor to receive data associated with an image and a depth map of an object. The instructions may also cause the processor to determine an object-surface point cloud based on the image and the depth map. The instructions may additionally cause the processor to determine multi-resolution receptive fields based on the object-surface point cloud. The instructions may further cause the processor to pass the multi-resolution receptive fields through convolutional encoders to learn an object centric representation of the object. The object centric representation is utilized to electronically control at least one electronic component to complete at least one object specific task associated with the object.

According to yet another aspect, a non-transitory computer readable storage medium storing instructions is provided. The instructions, when executed by a computer, which includes a processor, may perform a method that includes receiving data associated with an image and a depth map of an object. The method may also include determining an object-surface point cloud based on the image and the depth map. The method may additionally include determining multi-resolution receptive fields based on the object-surface point cloud. The method may further include passing the multi-resolution receptive fields through convolutional encoders to learn an object centric representation of the object. The object centric representation is utilized to electronically control at least one electronic component to complete at least one object specific task associated with the object.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIG. 5 is a process flow diagram of a method for multimodal object-centric representation learning according to an exemplary embodiment of the present disclosure.

DETAILED DESCRIPTION

Figure 1:
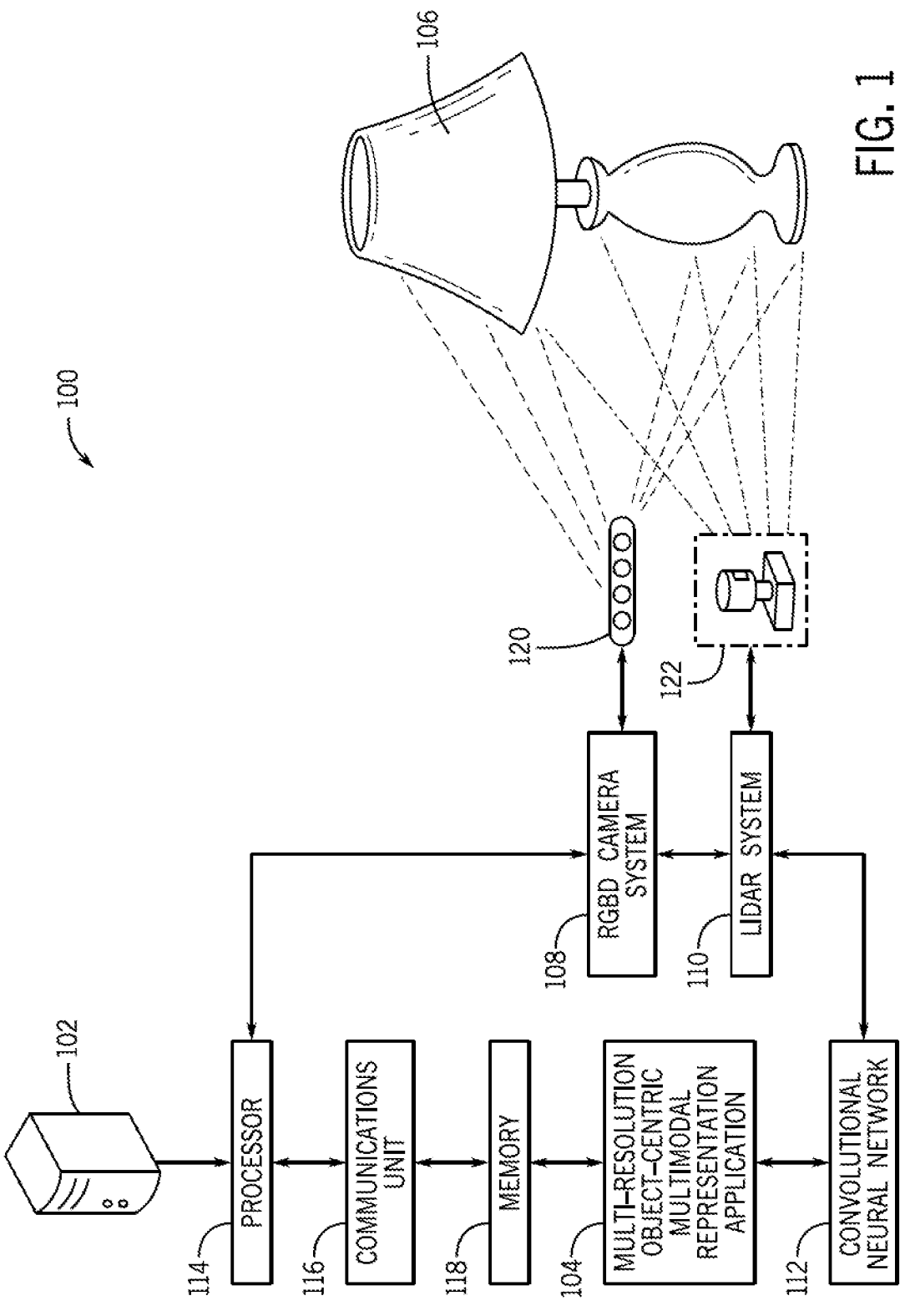
FIG. 1 is a schematic view of an exemplary operating environment for multimodal object-centric representation learning according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module may also include logic, a software-controlled microprocessor, a discreet logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting the same, FIG. 1 is a schematic view of an exemplary operating environment 100 for multimodal object-centric representation learning according to an exemplary embodiment of the present disclosure. The operating environment 100 includes a system that provides for the computer-implemented execution of a framework to learn rick representation of objects using red, green, blue (RGB) image and depth information.

In an exemplary embodiment, the operating environment 100 may include an externally hosted server infrastructure (external server) 102 that is configured to execute a multi-resolution object-centric multimodal representation application (object-centric application) 104. As discussed in more detail below, the object-centric application 104 may be configured to execute processes that are configured to allow the learning of a rich object-centric representation from visual and depth observations.

As shown in the FIG. 1, the object-centric application 104 may be configured to receive data associated with an object 106 and may learn an object-centric representation based on visual and depth observations of the object 106. In the exemplary embodiment of FIG. 1, the object 106 is represented as a lamp. However, it is to be appreciated that the object 106 may include any type of object, including, but not limited to, a hand-held object, a static object, a dynamic object that may be included within one or more environments including, but not limited to, internal environments, external environments, vehicular environments, manufacturing environments, etc.

As discussed in more detail below, the object-centric application 104 may be configured to receive image data that may be associated with RGB images of the object 106 that may be provided by a Red Green Blue Image and Depth camera system (RGBD camera system) 108 that may be operably connected to or may wirelessly communicate with the external server 102. The object-centric application 104 may also be configured to receive depth information associated with the object 106 that may be provided by the RGBD camera system 108 and/or a LiDAR system 110 that may be operably connected to or may wirelessly communicate with the external server 102.

Upon receiving the RGB information, the object-centric application 104 may be configured to utilize one or more components of the external server 102 to execute one or more computer-implemented processes that analyze the image data and the depth data and are configured to process an object depth map associated with the object 106. In one or more embodiments, the object-centric application 104 may be configured to utilize the two information sources of RGB image data and depth data and may be configured to determine three-dimensional (3d) point clouds of a surface of the object 106.

As discussed below, for each point of the point cloud, the object-centric application 104 may be configured to project points back into the RGB image of the object 106 and may determine multiple visual receptive fields that define a size of a region of the object 106 and that pertain to a feature of the object 106. The object-centric application 104 may be configured to encapsulate each visual receptive field within a processed bounding box that are respectively centered around each projected point and may each be configured with respective dimensions and shapes.

In an exemplary embodiment, the object-centric application 104 may be configured to input data associated with each of the bounding boxes into a convolutional neural network (CNN) 112 that includes a plurality of convolutional encoders (represented in FIG. 3) that are each configured to process data of a receptive field to classify data associated with the receptive field. The object-centric application 104 may be configured to group together the output of each of the plurality of convolutional encoders to learn an object centric representation of the object 106 that may be utilized to complete one or more object related downstream tasks, including, but not limited to, object pose estimation, object detection, object segmentation, object dynamic prediction, object attribute identification, object classification, and the like.

In one or more embodiments, the object-centric application 104 may be configured to send one or more commands to one or more externally hosted electronic components (not shown) to complete one or more object specific tasks associated with the object 106 that may be related to the one or more object related down steam tasks. In an illustrative embodiment, the object-centric application 104 may be configured to send one or more commands to an electronic control unit (not shown) of an autonomous vehicle (not shown) to account for object dynamic prediction of projected travel paths of one or more dynamic objects based on the object centric representation of the object 106.

In another illustrative embodiment, the object-centric application 104 may be configured to send one or more commands to a processor (not shown) of a three-dimensional (3d) printer to utilize the object centric representation as a 3d model to construct a 3d printout of the object 106. In an additional illustrative embodiment, the object-centric application 104 may be configured to send one or more commands to an automation controller (not shown) of a manufacturing apparatus to enable the manufacturing apparatus to complete one or more manufacturing processes to manufacture the object 106 and/or one or more components that may be associated with the object 106. It is to be appreciated that the above mentioned illustrative embodiments are non-limiting illustrative examples of use cases that may be exemplary of one or more commands provided by the object-centric application 104 and that various types and/or configurations of electronic components that may be associated with numerous applications may receive commands from the object-centric application 104 based on the learned object centric representation of the object 106.

The object-centric application 104 may provide an improvement in the technology of object-centric representation artificial intelligence learning by providing a system that learns a multimodal object-centric representation that carries thorough information about depth and visual appearance of an object 106 that is utilized to complete downstream tasks that may be associated with the object 106. The functionality of the object-centric application 104 allows the utilization of two sources of information in the form of RGB image information and depth information to enable the learning of an object-centric representation of an object 106 without the need of multi-dimensional pose estimation of the object 106 and without the need to train numerous complex and manually intensive datasets.

With continued reference to FIG. 1, the external server 102 may be operably controlled by a processor 114 that may be configured to execute the object-centric application 104. In particular, the processor 114 may be configured to execute one or more applications, operating systems, database, and the like. The processor 114 may also include internal processing memory, an interface circuit, and bus lines for transferring data, sending commands, and communicating with the plurality of components of the external server 102.

The processor 114 may be operably connected to a communication unit 116 of the external server 102. The communication unit 116 may include one or more network interface cards (not shown) that may be configured to connect to one or more computing systems through an internet cloud (not shown). In particular, the communication unit 124 may be configured to provide secure communications between the external server 102 and/one or more electronic components (not shown) that may be utilized to complete one or more object specific tasks associated with the object 106 that may be related to the one or more object related down steam tasks. In some embodiments, the communication unit 124 may be configured to provide secure communications between the external server 102, the RGBD camera system 108 and/or the LiDAR system 110 that may be configured to provide RGB image information and depth information pertaining to the object 106 to the object-centric application 104.

In one embodiment, the processor 114 may be operably connected to a memory 118 of the external server 102. Generally, the processor 114 may communicate with the memory 118 to execute the one or more applications, operating systems, and the like that are stored within the memory 118. In one embodiment, the memory 118 may store one or more executable application files that are associated with the object-centric application 104. In an exemplary embodiment, the memory 118 of the external server 102 may be configured to store the CNN 112.

In an exemplary embodiment, the CNN 112 may be configured to execute machine learning/deep learning techniques to process and analyze sequences of data points such as multi-resolution representative fields that are inputted to the CNN 112 by the object-centric application 104. The CNN 112 may include a plurality of convolutional encoders. As discussed below, the plurality of convolutional encoders may be configured to extract a set of visual features from multiple resolutions around an image coordinate 2d projection to output a representation of visual information for the given object point that may include, but may not be limited to, a summation, averaging, taking the maximum, concatenating, attention mechanism, etc. The plurality of convolutional encoders may be configured to thereby output the multimodal object-centric representation that is learned as a set of multi-resolution features extracted from the image projection of object points to the object-centric application 104 to be utilized for downstream tasks. The CNN 112 may be trained with data points that are associated with each of a plurality of features that may extracted around projected object points.

In an exemplary embodiment, the RGBD camera system 108 may be operably connected to a RGBD camera 120. It is to be appreciated that the RGBD camera system 108 may be operably connected to more than one RGBD camera 120. However, for the purposes of simplicity this disclosure will describe the utilization of the RGBD camera 120 as a single camera with respect to capturing RGB images and depth information of the object 106. In one embodiment, the RGBD camera 120 may be configured to capture RGB bands that are configured to capture rich information about object appearance that pertain to the object 106.

In some configurations, the RGBD camera 120 may also be configured as a depth camera that includes a depth sensor that is configured to capture a depth image of the object 106 and may determine three dimensional depth data that is output in the form of a 3d depth map. In one or more embodiments, upon capturing an RGB image of the object 106 and/or a depth image of the object 106, the RGBD camera 120 may communicate respective data to the RGBD camera system 108. The RGBD camera system 108 may be configured to communicate RGB image data associated with the RGB image of the object 106 and depth data associated with the 3d depth map of the object 106 to the object-centric application 104 to be further analyzed, as discussed below.

In an exemplary embodiment, the LiDAR system 110 may be operably connected to a LiDAR sensor 122. It is to be appreciated that the LiDAR system 110 may be operably connected to more than one LiDAR sensor 122. However, for the purposes of simplicity this disclosure will describe the utilization of the LiDAR sensor 122 as a single sensor with respect to capturing depth information of the object 106. In one configuration, the LiDAR sensor 122 may be configured to include dimensional LiDAR emitting devices that may be configured to oscillate and emit one or more laser beams of ultraviolet, visible, or near infrared light toward the object 106.

The LiDAR sensor 122 may be configured to receive one or more reflected laser waves (e.g., signals) that are reflected off the object 106 and may determine three-dimensional depth data associated with the object 106 that is output in the form of a 3d depth map. In particular, the LiDAR sensor 122 may be configured to evaluate the reflected laserwaves to determine LiDAR coordinates that may be associated with the three dimensional depth of the object 106. In one or more embodiments, upon determining depth data associated with the object 106, the LiDAR sensor 122 may communicate respective data to the LiDAR system 110. The LiDAR system 110 may be configured to communicate depth data associated with the 3d depth map of the object 106 to the object-centric application 104 to be further analyzed, as discussed below.

II. The Multi-Resolution Object-Centric Multimodal Representation Application and Related Methods Components of the object-centric application 104 will now be described according to an exemplary embodiment and with continued reference to FIG. 1. In an exemplary embodiment, the object-centric application 104 may be stored on the memory 118 and may be executed by the processor 114 of the external server 102. In another embodiment, the object-centric application 104 may be executed on a different externally hosted computing system (not shown) that may be located in a different location than the external server 102 and may be accessed by the communication unit 116 of the external server 102 to be executed by the processor 114 of the external server 102.

Figure 2:
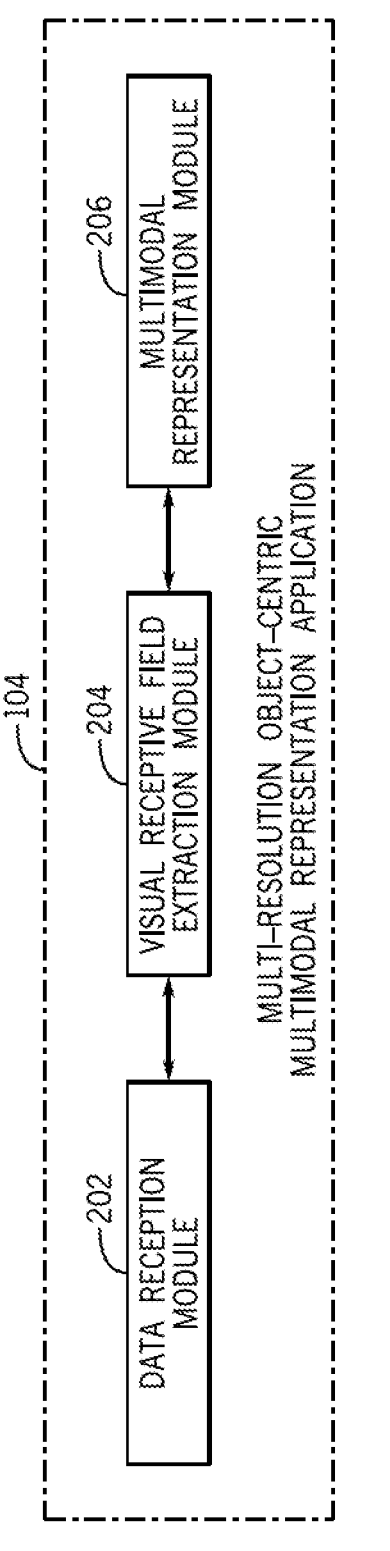
FIG. 2 is a schematic overview of the object-centric application according to an exemplary embodiment of the present disclosure.

FIG. 2 is a schematic overview of the object-centric application 104 according to an exemplary embodiment of the present disclosure. In an exemplary embodiment, the object-centric application 104 may include a plurality of modules 202-206 that may be configured to provide multimodal object-centric representation learning. The plurality of modules 202-206 may include a data reception module 202, a visual receptive field extraction module 204, and a multimodal representation module 206. However, it is appreciated that the object-centric application 104 may include one or more additional modules and/or sub-modules that are included in lieu of the modules 202-206.

Figure 3:
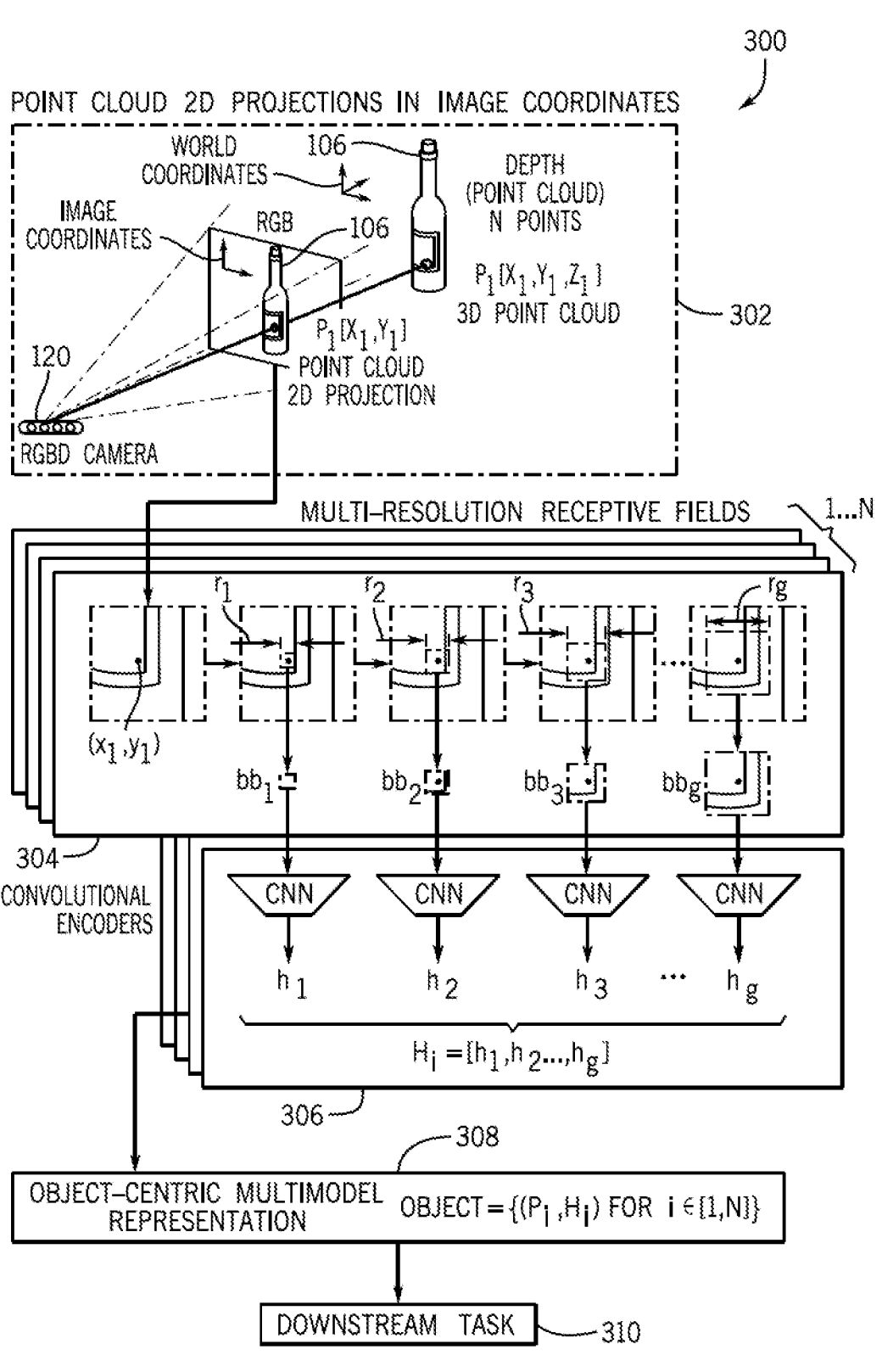
FIG. 3 is an illustrative framework that is executed by the object-centric application for multimodal object-centric representation learning according to an exemplary embodiment of the present disclosure.

FIG. 3 is an illustrative framework 300 that is executed by the object-centric application 104 for multimodal object-centric representation learning according to an exemplary embodiment of the present disclosure. In an exemplary embodiment, the RGBD camera 120 may be configured to capture an RGB image of the object 106 and may determine RGB image data associated with RGB image coordinates of the object 106. The RGBD camera 120 may additionally be configured to determine three dimensional depth data that is output in the form of a 3d depth map. The RGBD camera system 108 may be configured to communicate the RGB image data and the depth data to the data reception module 202 of the object-centric application 104.

Upon receiving the RGB image data and the depth data, the data reception module 202 may be configured to communicate respective data to the visual receptive field extraction module 204 of the object-centric application 104. As represented at step 302 of the framework 300 of FIG. 3, the visual receptive field extraction module 204 may be configured to determine point clouds on the surface of the object 106 based on the depth map. The object point cloud obtained from the depth map may include a set of 3d object surface points of the object 106 that are determined in world coordinates.

The visual receptive field extraction module 204 may be configured to enable the projection of each 3d object surface point back to the RGB image to register 2d object points in the image coordinates such that each 3d point on the object depth map is registered with a 2d object point on the RGB image. In other words, for each point of the point cloud, which is each point on the object surface, the position of that point that includes 3d point cloud coordinates (X, Y, Z) and 3d world coordinates are projected back into the RGB image. This enables the visual receptive field extraction module 204 to create a correspondence between each point of the RGB image and each point of the object surface of the object 106.

In one or more embodiments, upon the completion of the point cloud 2d projection in the image coordinates as represented in step 302 of the framework 300, the visual receptive field extraction module 204 may be configured to extract multi-resolution receptive fields that are based on the object-surface point clouds. In particular, the visual receptive field extraction module 204 may be configured to processes bounding boxes that are respectively centered at each of the 2d object points and may each be configured with respective dimensions and shapes. Each bounding box is processed to create a receptive field around each point and is enlarged as represented at step 304 of the framework 300 of FIG. 3.

In particular, visual receptive fields may be obtained by cropping bounding boxes centered at each 2d object point. The visual receptive field extraction module 204 may be configured to gradually increase the size of each bounding box according to an arbitrary predefined discrete set of values to construct a multi-resolution receptive field around the projected 2d object points. Accordingly, the visual receptive field extraction module 204 may be configured to create multi-resolution receptive fields for each of the projected points. Upon constructing the multi-resolution receptive fields around each of the projected 2d object points, the visual receptive field extraction module 204 may communicate data pertaining to the multi-resolution receptive fields to the multimodal representation module 206 of the object-centric application 104.

As represented in step 306 of the framework 300 of FIG. 3, the multimodal representation module 206 may be configured to pass data associated with each bounding box to the CNN 112 to allow the convolutional encoders of the CNN 112 to be applied on each bounding box. In other words, each bounding box which may be configured in a respective size and may be passed individually to the CNN 112 through the convolutional encoders of the CNN 112. In one or more embodiments, the CNN 112 may be pretrained to extract features around each projected object point. In one configuration, for each 3d object point, the convolutional encoders may extract a set of visual features from multiple resolutions around the image coordinate 2d projection $p_i$ as $H_i=[h_1, h_2, \ldots, h_K]$. In one embodiment, the set of visual features may be output by the CNN 112 to the multimodal representation module 206.

Upon receiving the set of visual features that are output by the CNN 112, the multimodal representation module 206 may be configured to group the set of visual features for each respective projected object point. Accordingly, for each 3d object point, a set of features may be extracted and communicated to the multimodal representation module 206 such that sets of features are output from multiple resolutions around the image coordinate 2d projection. As represented at step 308 of the framework 300 of FIG. 3, the multimodal representation module 206 may be configured to group the set of visual features in various ways to represent the visual information for each given object point and may be utilized for the multimodal representation module 206 to learn the object-centric multimodal representation of the object 106: $Object \equiv \{Pi, Hi$ for $i \in [1, N]\}$.

In other words, based on the grouping of all of the multi-resolution features that are output by the CNN 112 for all of the points on the object surface, the multimodal representation module 206 may be configured to determine an object-centric multi-modal representation of the object 106 that is a set of each point of the object and the visual features that are collected through the multi-resolution receptive fields. As represented in step 310 of the framework 300 of FIG. 3, the object-centric representation may be used in a downstream task that may include, but may not be limited to object detection, object classification, object segmentation, object pose estimation, object attribute identification, and the like. The multimodal representation module 206 may be configured to send one or more commands to one or more externally hosted electronic components to complete one or more object specific tasks associated with the object 106 that may be related to the one or more object related down steam tasks.

Figure 4:
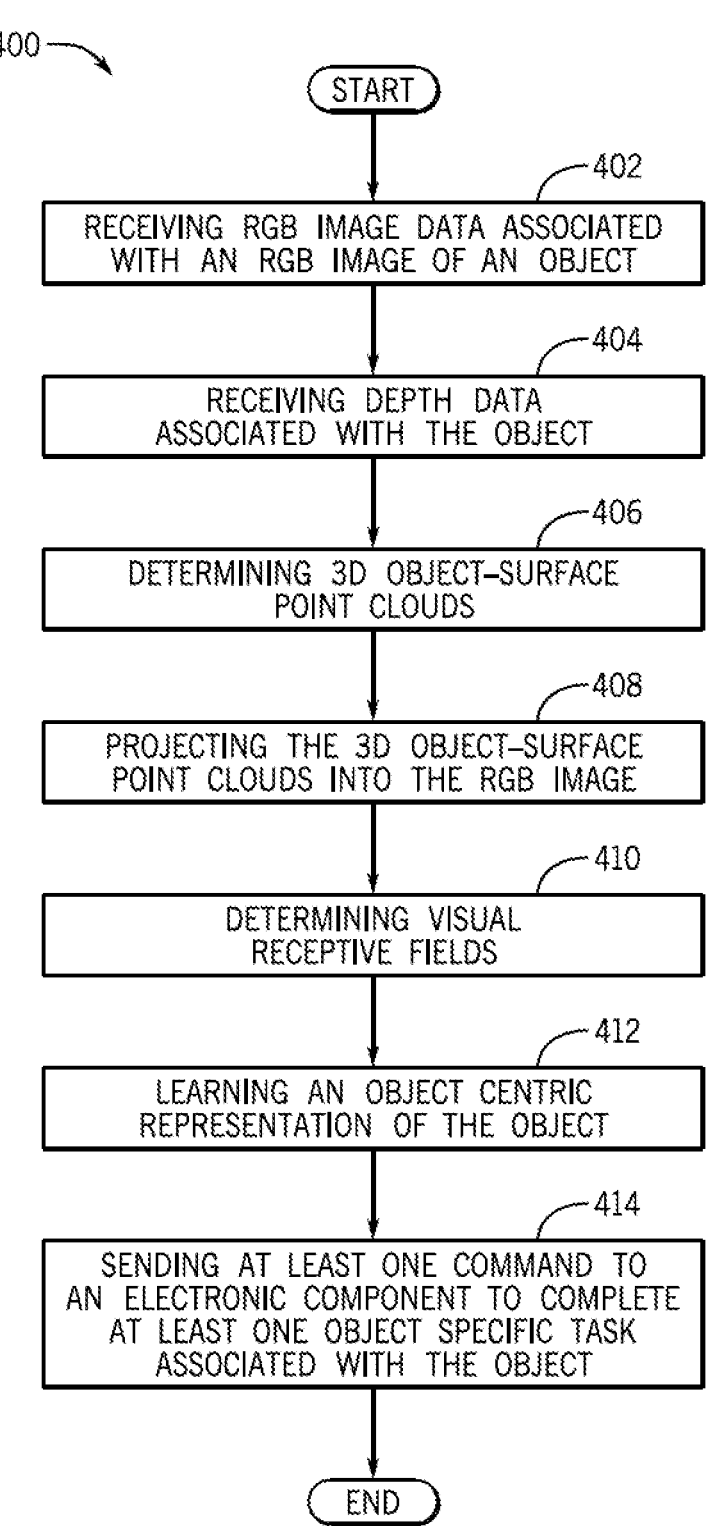
FIG. 4 is a process flow diagram of a method of learning an object centric representation of the object according to an exemplary embodiment of the present disclosure.

FIG. 4 is a process flow diagram of a method 400 of learning an object centric representation of the object 106 according to an exemplary embodiment of the present disclosure. FIG. 4 will be described with reference to the components of FIG. 1, FIG. 2, and FIG. 3 though it is to be appreciated that the method 400 of FIG. 4 may be used with other systems/components. The method 400 may begin at block 402, wherein the method 400 may include receiving RGB image data associated with an RGB image of an object 106.

In one embodiment, the data reception module 202 of the object-centric application 104 may be configured to communicate with the RGBD camera system 108 to obtain RGB image data based on one or more RGB images of the object 106 that have been captured by the RGBD camera 120. The RGB image data may be associated with RGB image coordinates of the object 106 to provide data of the visual observation of the object 106. Upon receiving the RGB image data, the data reception module 202 may be configured to communicate respective data to the visual receptive field extraction module 204 of the object-centric application 104.

The method 400 may proceed to block 404, wherein the method 400 may include receiving depth data associated with the object 106. In one embodiment, the data reception module 202 of the object-centric application 104 may be configured to communicate with the LiDAR system 110 to obtain depth data associated with the object 106. As discussed above, the LiDAR system 110 may be operably connected to the LiDAR sensor 122. The LiDAR sensor 122 may be configured to receive one or more reflected laser waves (e.g., signals) that are reflected off the object 106 and may determine three-dimensional depth data associated with the object 106 that is output in the form of a 3d depth map and communicated to the data reception module 202 from the LiDAR system 110 as depth data.

In some embodiments, the data reception module 202 may additionally or alternatively receive depth data from the RGBD camera system 108. The RGBD camera 120 may also be configured as a depth camera that includes a depth sensor that is configured to capture a depth image of the object 106 and may determine three dimensional depth information of the object 106 that is output in the form of a 3d depth map and communicated to the data reception module 202 from the LiDAR system 110 as depth data.

According to one aspect, if depth data is received by the data reception module 202 from both the LiDAR system 110 and the RGBD camera system 108, the data reception module 202 may be configured to analyze the depth data received from each source. In some configurations, the data reception module 202 may be configured to match object points such that each 3d point on the object depth map included within the depth data obtained from the LiDAR system 110 is matched with each 3d point on the object depth map included within the depth data obtained from the RGBD camera system 108.

The data reception module 202 may thereby aggregate the matched up object points from both sources to determine depth data that is associated with the object 106 to be utilized to learn the object centric representation of the object 106. Upon receiving the depth data directly from the LiDAR system 110 or the RGBD camera system 108 or processing the depth data based on the aggregation of data points from the LiDAR system 110 and the RGBD camera system 108, the data reception module 202 may be configured to communicate respective data to the visual receptive field extraction module 204 of the object-centric application 104.

The method 400 may proceed to block 406, wherein the method 400 may include determining 3d object-surface point clouds. In an exemplary embodiment, the visual receptive field extraction module 204 may be configured to analyze the image data and the depth data received from the data reception module 202. The visual receptive field extraction module 204 may be configured to determine an object point cloud from the depth map included within the depth data. The object point cloud obtained from the depth may be determined as a set of 3d object surface points in the world coordinate $\{P_i \in R^3; i=[1,N]\}$.

The method 400 may proceed to block 408, wherein the method 400 may include projecting the 3d object-surface point clouds into the RGB image. In one or more embodiments, the visual receptive field extraction module 204 may be configured to use the RGBD camera intrinsic matrix and is configured to project each 3d object point to the RGB image coordinates $p_i = K_{camera} \times P_i$. In one embodiment, the projection may register a 2d object point in the image coordinates $\{p_i \in R^2; i=[1,N]\}$ for each 3d point in the point cloud.

With continued reference to the method 400 of FIG. 4, the method 400 may proceed to block 410, wherein the method 400 may include determining visual receptive fields. In an exemplary embodiment, upon registering a 2d object point in the image coordinates for each 3d point in the point cloud, the visual receptive field extraction module 204 may be configured to process and encapsulate each 2d object point within a bounding box and may each be configured with respective dimensions and shapes.

The visual receptive field extraction module 204 may be configured to determine visual receptive fields by cropping the respective bounding boxes ($bb_j$) to be centered at each of the 2d object points. In one embodiment, the visual receptive field extraction module 204 may be configured to gradually increase the size of each bounding box according to an arbitrary predefined discrete set of values ($r_1, r_2, \ldots, r_K$) to construct multi-resolution visual receptive fields around the projected 2d object points. In an exemplary embodiment, upon construction of the multi-resolution visual receptive fields around the projected 2d object points, the visual receptive field extraction module 204 may be configured to communicate data associated with each of the multi-resolution visual receptive fields to the multimodal representation module 206 of the object-centric application 104.

The method 400 may proceed to block 412, wherein the method 400 may include learning an object centric multimodal representation of the object 106. In an exemplary embodiment, the multimodal representation module 206 may be configured to pass data associated with each bounding box to the CNN 112 to allow the convolutional encoders of the CNN 112 to be applied on each bounding box. In other words, each bounding box which may be configured in a respective size may be passed individually to the CNN 112 through the convolutional encoders of the CNN 112. In one or more embodiments, the CNN 112 may be pretrained to extract features around each projected object point. In one configuration, for each 3d object point, the convolutional encoders may extract a set of visual features from multiple resolutions around the image coordinate 2d projection $p_i$ as $H_i = [h_1, h_2, \ldots, h_K]$.

In an exemplary embodiment, each set of features $H_i$ may be grouped in various ways to represent the visual information for the given object point $P_i$ such as: summation, averaging, taking the maximum, concatenating, attention mechanism, etc. The multimodal object-centric representation is learned as a set of multi-resolution visual features extracted from the image projection of the object points. In other words, the multimodal object-centric representation is learned as a set of 3d position of the object points and their visual feature vector.

The method 400 may proceed to block 414, wherein the method 400 may include sending at least one command to an electronic component to complete at least one object specific task associated with the object 106. In one or more embodiments, the object-centric representation may be used in a downstream task that may include, but may not be limited to object detection, object classification, object segmentation, object pose estimation, object attribute identification, and the like. The multimodal representation module 206 may be configured to send one or more commands to one or more externally hosted electronic components to complete one or more object specific tasks associated with the object 106 that may be related to the one or more object related down steam tasks.

FIG. 5 is a process flow diagram of a method 500 for multimodal object-centric representation learning according to an exemplary embodiment of the present disclosure. FIG. 5 will be described with reference to the components of FIG. 1, FIG. 2, and FIG. 3 though it is to be appreciated that the method 500 of FIG. 5 may be used with other systems/components. The method 500 may begin at block 502, wherein the method 500 may include receiving data associated with an image and a depth map of an object 106.

The method 500 may proceed to block 504, wherein the method 500 may include determining an object-surface point cloud based on the image and the depth map. The method 500 may proceed to block 506, wherein the method 500 may include determining multi-resolution receptive fields based on the object-surface point cloud. The method 500 may proceed to block 508, wherein the method 500 may include passing the multi-resolution receptive fields through convolutional encoders to learn an object centric representation of the object 106. In one embodiment, the object centric representation is utilized to electronically control at least one electronic component to complete at least one object specific task associated with the object 106.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A computer-implemented method for multimodal object-centric representation learning comprising:

receiving data associated with an image and a depth map of an object;

determining an object-surface point cloud based on the image and the depth map;

determining multi-resolution receptive fields based on the object-surface point cloud, including projecting object-surface points of the object-surface point cloud into the image to register a 2d object point in image coordinates of the object for each object-surface point of the object-surface point cloud and encapsulating the 2d object point with a plurality of bounding boxes of different sizes as the multi-resolution receptive fields; and passing the multi-resolution receptive fields through convolutional encoders to learn an object centric representation of the object, wherein the object centric representation is utilized to electronically control at least one electronic component to complete at least one object specific task associated with the object.

2. The computer-implemented method of claim 1, wherein receiving data associated with the image and the depth map of the object includes receiving RGB image data associated with RGB image coordinates of the object to provide data of a visual observation of the object.

3. The computer-implemented method of claim 2, wherein receiving data associated with the image and the depth map of the object includes receiving depth data associated with the object from at least one of: an RGBD camera and a LiDAR system, wherein the depth data is associated with a three dimensional depth information of the object that is output as the depth map.

4. The computer-implemented method of claim 2, wherein determining the object-surface point cloud includes determining the object-surface point cloud based on an analysis of the depth map, wherein the object-surface points of the object-surface point cloud are determined as a set of 3d object surface points in a world coordinate.

5. The computer-implemented method of claim 4, wherein the projecting of the object-surface points includes projecting the set of 3d object surface points into the image of the object, wherein the projection registers the 2d object point in the RGB image coordinates for each 3d object surface point in the object-surface point cloud.

6. The computer-implemented method of claim 5, wherein determining the multi-resolution receptive fields includes cropping the bounding boxes to be centered at each 2d object point.

7. The computer-implemented method of claim 6, wherein determining the multi-resolution receptive fields includes gradually increasing a size of each bounding box according to an arbitrary predefined discrete set of values to construct the multi-resolution receptive fields around each projected 2d object point.

8. The computer-implemented method of claim 7, wherein passing the multi-resolution receptive fields through the convolutional encoders to learn the object centric representation of the object includes passing data associated with each bounding box to the convolutional encoders.

9. The computer-implemented method of claim 7, wherein the convolutional encoders extract a set of visual features from multiple resolutions around each projected 2d object point, wherein each set of visual features are grouped to represent visual information for each object point.

10. The computer-implemented method of claim 1, the plurality of bounding boxes are passed individually through the convolution encoders.

11. A system for multimodal object-centric representation learning comprising:

a memory storing instructions when executed by a processor cause the processor to:

receive data associated with an image and a depth map of an object;

determine an object-surface point cloud based on the image and the depth map;

determine multi-resolution receptive fields based on the object-surface point cloud, including projecting object-surface points of the object-surface point cloud into the image to register a 2d object point in image coordinates of the object for each object-surface point of the object-surface point cloud; and pass the multi-resolution receptive fields through convolutional encoders to learn an object centric representation of the object and encapsulate the 2d object point with a plurality of bounding boxes of different sizes as the multi-resolution receptive fields, wherein the object centric representation is utilized to electronically control at least one electronic component to complete at least one object specific task associated with the object.

12. The system of claim 11, wherein receiving data associated with the image and the depth map of the object includes receiving RGB image data associated with RGB image coordinates of the object to provide data of a visual observation of the object.

13. The system of claim 12, wherein receiving data associated with the image and the depth map of the object includes receiving depth data associated with the object from at least one of: an RGBD camera and a LIDAR system, wherein the depth data is associated with a three dimensional depth information of the object that is output as the depth map.

14. The system of claim 12, wherein determining the object-surface point cloud includes determining the object-surface point cloud based on an analysis of the depth map, wherein the object-surface points of the object-surface point cloud are determined as a set of 3d object surface points in a world coordinate.

15. The system of claim 14, wherein the projecting of the object-surface points includes projecting the set of 3d object surface points into the image of the object, wherein the projection registers the 2d object point in the RGB image coordinates for each 3d object surface point in the object-surface point cloud.

16. The system of claim 15, wherein determining the multi-resolution receptive fields includes cropping the bounding boxes to be centered at each 2d object point.

17. The system of claim 16, wherein determining the multi-resolution receptive fields includes gradually increasing a size of each bounding box according to an arbitrary predefined discrete set of values to construct the multi-resolution receptive fields around each projected 2d object point.

18. The system of claim 17, wherein passing the multi-resolution receptive fields through the convolutional encoders to learn the object centric representation of the object includes passing data associated with each bounding box to the convolutional encoders.

19. The system of claim 17, wherein the convolutional encoders extract a set of visual features from multiple resolutions around each projected 2d object point, wherein each set of visual features are grouped to represent visual information for each object point.

20. A non-transitory computer readable storage medium storing instructions that when executed by a computer, which includes a processor performs a method, the method comprising:

receiving data associated with an image and a depth map of an object;

determining an object-surface point cloud based on the image and the depth map;

determining multi-resolution receptive fields based on the object-surface point cloud, including projecting object-surface points of the object-surface point cloud into the image to register a 2d object point in image coordinates of the object for each object-surface point of the object-surface point cloud; and passing the multi-resolution receptive fields through convolutional encoders to learn an object centric representation of the object and encapsulating the 2d object point with a plurality of bounding boxes of different sizes as the multi-resolution receptive fields, wherein the object centric representation is utilized to electronically control at least one electronic component to complete at least one object specific task associated with the object.

21. The non-transitory computer readable storage medium of claim 20, wherein determining the multi-resolution receptive fields includes cropping the plurality of bounding boxes to be centered at each 2d object point, wherein the convolutional encoders extract a set of visual features from multiple resolutions around each 2d object point, wherein each set of visual features are grouped to represent visual information for each object point.

* * * * *